United States Patent [19]

Turba

[11] Patent Number: 4,523,755
[45] Date of Patent: Jun. 18, 1985

[54] SURFACE FOR SPORTS AREAS, PARTICULARLY TENNIS COURTS, AND ITS MANUFACTURE

[76] Inventor: Egon Turba, Rothwiese 39, 8122 Penzberg, Fed. Rep. of Germany

[21] Appl. No.: 268,105

[22] Filed: May 28, 1981

[51] Int. Cl.³ .................. A63C 19/02; C04B 31/20; C04B 13/00; E01C 13/00

[52] U.S. Cl. .......................... 272/3; 106/98; 106/97; 404/31

[58] Field of Search .............. 106/90, 98; 272/3, 56.5, 272/4, 5; 52/390; 273/29 B; 404/27, 31; 428/331

[56] References Cited

U.S. PATENT DOCUMENTS

| | | | |
|---|---|---|---|
| 2,407,739 | 9/1946 | Ferrante | 106/98 |
| 3,570,846 | 3/1971 | Weber et al. | 272/56.5 |
| 3,661,604 | 5/1972 | Artmann | 106/98 |
| 3,754,954 | 8/1973 | Gabriel et al. | 106/97 |
| 3,955,992 | 5/1976 | Roberts | 106/98 X |

FOREIGN PATENT DOCUMENTS

| | | |
|---|---|---|
| 1158430 | 11/1963 | Fed. Rep. of Germany . |
| 1646493 | 1/1971 | Fed. Rep. of Germany . |
| 2146709 | 3/1973 | Fed. Rep. of Germany . |
| 37278 | 12/1977 | France ............ 272/3 |
| 23140 | 3/1978 | France ............ 272/3 |
| 308814 | 6/1930 | United Kingdom ...... 404/31 |
| 388377 | 2/1933 | United Kingdom ...... 404/31 |

Primary Examiner—Richard J. Apley
Assistant Examiner—Gregory Beaucage
Attorney, Agent, or Firm—Gordon W. Hueschen

[57] ABSTRACT

A surface for sports areas, particularly tennis courts, is prepared by applying an intimate mixture of brick dust, other mineral material, non-hydrated tile cement, and water to a substantially level foundation and allowing said mixture to set up by hydration of the tile cement.

16 Claims, 4 Drawing Figures

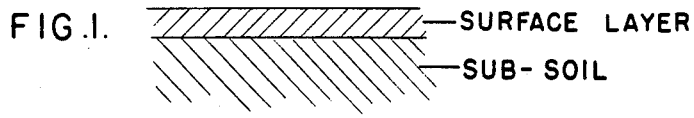
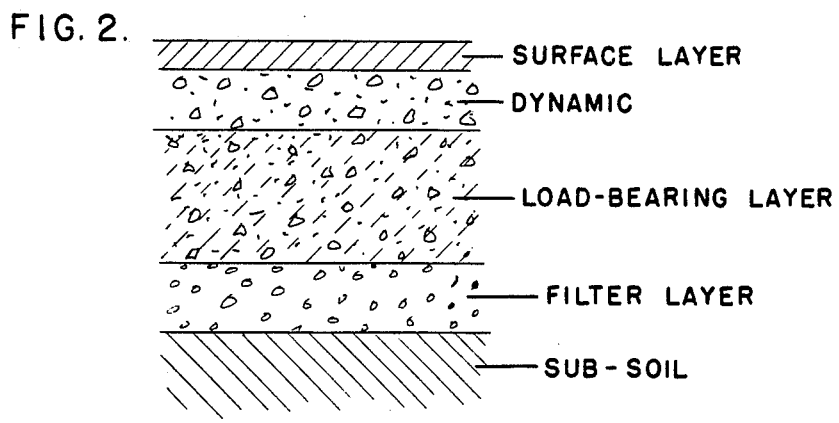
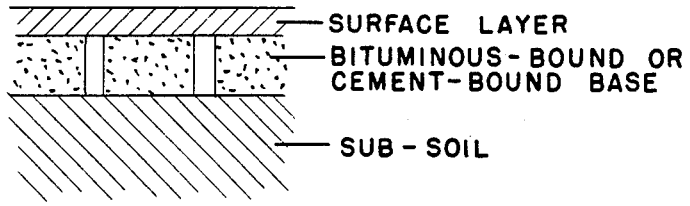
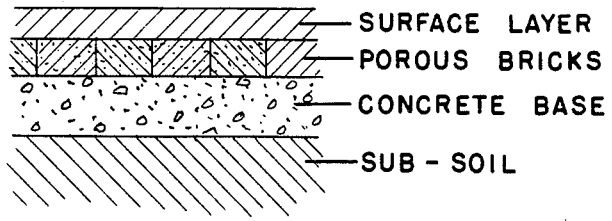

SURFACE FOR SPORTS AREAS, PARTICULARLY TENNIS COURTS, AND ITS MANUFACTURE

BACKGROUND OF INVENTION

Field of Invention and Prior Art

The invention concerns a surface for sports areas, particularly tennis courts, the top layer of which consists of a setting compound formed essentially of brick dust, other mineral material, and inorganic binding agent.

Such a surface is known from the German Patent Specification No. 441 047. For the preparation of a top layer for tennis courts, according to this proposal, a composition is laid consisting of 25% fine brick dust, 20% coarser brick dust, 15% binding grit, 20% green color, 10% black lime*, 5% cement**, and 5% rock salt. Furthermore, a process is known for the stabilization of tennis courts against mechanical wear, wherein the stone mixture forming the top layer of the tennis court surface is mixed with an aqueous dispersion of water insoluble homopolymers or copolymers of vinyl compounds (see DE-OS No. 1 937 761). Furthermore, in order to minimize maintenance work and to adapt to changing weather conditions, it has been proposed to incorporate into the top layer of a playground surface granulated siliceous material of great strength, in part very hard, and having a high water-absorbing capacity, such as hydroscopic silica, kieselguhr, silica gel, vermiculite, or siliceous fireproof clay (see DE-OS No. 2 122 930).

*(a lump variety of hydraulic lime) ** hydraulic

These proposals have all failed in practice. So far there has been no success in producing a surface which, on the one hand, has the advantageous features of a typical barn floor with a surface of brick dust or red gravel and, on the other, possesses the resistance to wear and to winter that typical hard courts possess.

Tennis courts having a top layer of brick dust on a "dynamic layer" of brick gravel, slag particles and similar substances, are conducive to optimum playing conditions due first, to the characteristics which affect foothold and sliding, and second, to the elasticity of the entire installation. Special significance attaches to a feature allowing a predetermined degree of sliding which enables the competitor's movement energy to be absorbed by the top layer, so that a stopping action is not completely absorbed by the competitor's muscles and bones. In this way early fatigue is counteracted and the risk of injury reduced. This predetermined degree of sliding derives mainly from the fact that at a certain load individual particles of brick dust release themselves from their foundation and, behaving like balls or rollers, permit the sliding movement of the shoe on the top layer. In spite of a certain sliding characteristic the competitor must be assured of a fast start.

Considerable disadvantages accompany the good playing conditions of a tennis court having a brick dust surface as, for example, very demanding maintenance, the long retention of dampness with associated diminution of foothold, the creation of dust when the brick dust layer is insufficiently moist and, finally, low resistance to wear which leads to the known irregularities in the heavily used areas. Other disadvantages are the comparatively short life and the necessity of an annual spring service.

Some of these disadvantages do not occur with hard courts having a top layer of asphalt or concrete. However, such hard courts frequently are not satisfactory from a player's point of view because the characteristic sliding feature of the brick-dust court is missing. This increases premature fatigue and also the risk of injury; in addition, the considerable hardness and minimal elasticity of such courts leads to heavy ball wear and balls which are too fast in the case of a hard drive.

OBJECTS OF THE INVENTION

An object of the invention is to make available an improved surface for sports areas, particularly for tennis courts, which surface is considerably more durable and far less sensitive to the extremes of dampness and dryness than the well-known top layers of brick dust, which is substantially resistant to winter conditions, and which assures the good playing and sport physiological properties of a brick-dust top layer. A further object is a simple and economical process for the manufacture of such a surface. Further objects are to avoid the disadvantages of the prior art and to obtain such additional advantages as will appear on the description which follows.

BRIEF DESCRIPTION OF THE INVENTION

These objects are achieved, according to the invention, by a surface for sports areas, particularly tennis courts, which has a top layer consisting mainly of brick dust and other mineral material which is bonded by tile cement as a special binding agent. Preferably, fine-grained quartz sand serves as the other mineral material. Advantageous embodiments of the invention pertain to the proportions of brick dust, tile cement, and quartz sand in the paste used for preparing the surface, the grain size of the quartz sand, and the thickness of the top layer. The covering layer provided in the invention can form the barn floor surface of the customary barn floor surface construction, as is known from DIN 18 035, page 5. In addition, the surface according to the invention can be laid on a bitumen- or cement-bound base, pervious to water. A special base consists essentially of a step-dampening or cushioning layer of porous aerated cement blocks or stone pieces on a foundation of reinforced fine concrete and to a process in which a dough-like paste of tile cement, brick dust, and fine-grained other mineral material, preferably quartz sand, in water is applied on a suitable base or foundation having a substantially level surface and allowed to set up to provide a firm top layer having unusually high resistance to wear.

In accordance with the invention it has been established, surprisingly, that by the selected addition of tile cement and quartz sand to the well-known brick-dust, on the one hand, the strength of the brick dust layer is considerably increased, so that greater resistance to wear is achieved, and by the selected choice of the proportions of these components, on the other, the value of the sliding characteristic determined, for example, as static or sliding friction under a given load, can be adjusted over a wide range. In spite of the increased strength, the sliding characteristic in particular of the well-known brick-dust top layers can be maintained. In addition, the sliding characteristic can be adjusted to definite values for selected requirements. Finally, by selecting certain layer thicknesses, the degree of softness of the top layer can be influenced for a given composition.

The mixture of tile cement, brick dust, and quartz sand provided by the invention produces a top layer of unusually high resistance to wear, so that after many hours of tennis playing practically no maintenance work or service is required. The top layer is frost-proof, so that when combined with a winter-proof base or foundation, no special renovation work is needed after the winter break.

The top layer, made with the components provided by the invention, is shown to be resistant to water, yet it is water permeable to the required degree, i.e., water left on the surface after a rain is conducted rapidly, i.e., within about ten minutes, through the porous top layer to the foundation, from where it flows away. Moreover, even during considerable and prolonged drought, the top-layer particles do not become loose, so that any noticeable accumulation of dust does not occur.

In this way the surface according to the invention permits playing, largely independent of the weather, without additional measures, such as sweeping, rolling, and/or watering.

Finally, the top layer as visualized according to the invention can be very easily repaired by simply applying freshly prepared paste at worn places. This sets and adheres securely, even in very thin layers, to the existing material, without additional steps. Because of this property it is a very simple matter to make the boundary lines; at these lines grooves are cut out of the top layer, which is red because of the red brick dust, and into these grooves is poured paste made of the same components, which has been dyed or colored white.

BRIEF DESCRIPTION OF THE DRAWINGS

In the drawings:

FIG. 1 is a cross section showing a surface layer according to the invention, applied to a natural base;

FIG. 2 is a cross section showing a surface layer according to the invention, applied to a barn floor construction;

FIG. 3 is a cross section showing a surface layer according to the invention, applied to a bituminous-bound or cement-bound base;

FIG. 4 is a cross section showing a surface layer according to the invention, applied to a foundation comprising a layer of concrete or the like, having porous bricks laid end to end in rows jointlessly.

DETAILED DESCRIPTION OF THE INVENTION

In the following, in which the parts and percentages are by weight unless otherwise specified, the invention is explained in detail with the help of preferred applications. Brick dust, tile cement, quartz sand, and water are taken as initial components for such top layers.

The brick dust used is the well-known, commercially-available product as widely used for the preparation of the top layer of known tennis courts.

Tile cement also represents a known, commercially-available product which is defined by the technical world as hydraulic-setting thin-bed mortar (see DIN 18 156 part 1 and 2). Such hydraulic hardening thin-bed mortars are powdery mixtures of hydraulic binding agents, mineral additives (at the most 0.5 mm grain size), and organic supplements. The powdery thin-bed mortar is prepared by mixing with water and is ready for use after a brief ripening time. Within the scope of this invention it is preferable to use tile cements which fulfill the conditions for thin-bed mortar DIN 18 156-M (see DIN 18 156, part 2).

The composition of such tile cements is well known. For example, the German Patent specification No. 1 158 430 discloses the application of a mortar which, when dry, contains 24.8 to 89.9 percent Portland cement, 0.2 to 6.5 percent methyl cellulose having a viscosity between 10 and 7000 cP (centipoises), measured in a 2 percent aqueous solution, also approximately 10 to 75 percent additives, such as sand or ground limestone. To use, approximately 10 to 40 percent water is mixed in, so that the viscosity of the water phase of the mixture is at least 500 cP, for laying flagstone and tiles; the surface to be tiled is covered with a layer of mortar and the dry tiles are pressed into this. Also, in U.S. Pat. No. 2,934,932 a number of typical tile cement compositions suitable for the present purpose are given. From the German Patent specification No. 1 646 493 a bedding mortar is known which, in addition to cement and graded sand, contains 0.1 to 1.5 percent methyl cellulose and 1.0 to 10 percent of an interpolymer of 20 to 80 percent vinyl chloride and 80 to 20 percent vinyl propionate. In addition, this bedding mortar can contain 5 to 25 percent trass besides. Moreover, the German Auslegeschrift No. 2 146 709 describes the application of a mortar mixture for laying flagstones and tiles according to the thin-bed process, consisting of 25 to 85 percent cement, 0.05 to 0.15 percent methyl cellulose having a viscosity of 1000 to 3000 cP, measured in a 2 percent aqueous solution, 1.5 to 6 percent sulfonic acid group-containing melamine-formaldehyde condensation product having a viscosity of 40 to 500 cP, measured in a 20 percent aqueous solution, 0.02 to 0.1 percent water-soluble non-ionic polyacrylamide, based in every case on the total weight of the dry mixture, remainder sand and/or ground limestone. Additionally, this mortar mixture can contain 0.5 to 5 percent asbestos fibre.

With reference to these printed works, their contents are also to be regarded as part of the present specification, insofar as they concern the composition of tile cement, that is, hydraulic-setting thin-bed mortar in the sense of DIN 18 156, part 1 and part 2.

According to these printed works, such tile cements consist essentially of approximately 24.8 to 89.8 percent hydraulic cement, approximately 10 to 75 percent fine solid aggregate additives, such as, sand and/or ground limestone and approximately 0.2 to 6.5 percent methyl cellulose and can, in addition, contain further components, according to choice, i.e., up to 10 percent interpolymer of vinyl chloride and vinyl propionate, up to 6 percent melamine-formaldehyde condensation product, up to 0.1 percent polyacrylamide, up to 25 percent trass and/or up to 5 percent fibrous material, preferably asbestos. As examples, the following hydraulic cements may be mentioned: Portland cement, Portland slag cement, lime slag cement, iron-ore cement, Puzzolan cement, and the like. The following compositions have proved themselves particularly suitable for the present purpose:

|  | percent by weight |
|---|---|
| Tile cement I |  |
| Portland cement PZ 55 F | 48 |
| washed, fire-dried quartz sand 0.1–0.6 mm | 45 |
| dispersible powdered polymeride on the basis of vinyl chloride/vinyl propionate | 4.2 |
| methyl cellulose (degree of substitution 30% | 2.5 |

| | percent by weight |
|---|---|
| methoxyl; viscosity 10,000 mPas for a 20% aqueous solution according to Brookfield at 20° C. and 20 rpm) | |
| calcium oxalate | 0.3 |
| Tile cement II | |
| blast-furnace cement HOZ 35 L | 47 |
| washed, fire-dried quartz sand 0.2 to 0.6 mm | 48 |
| methyl hydroxyethyl cellulose (degree of substitution 25% methoxyl, 10% ethylene glycol ether; viscosity: 20,000 mPas for a 2% aqueous solution according to Brookfield at 20° C. and 20 rpm) | 2.5 |
| cellulose fibres, diameter: approximately 30 μm, length approximately 300 μm | 2.0 |
| calcium chloride | 0.5 |

The quartz sand used is that commonly used in the building industry, having the quality grade "finest"; quartz sand such as this has a mean grain size of 0.01 to 0.4 mm. The designation quartz sand shall include other fine-grain, inert mineral substances, and mixtures of silicon dioxide with such mineral substances, as well as finely milled silicon dioxide.

The named components brick dust, thin-bed mortar powder as tile cement, and quartz sand are made into a paste in water. In order to achieve the most homogeneously possible distribution, the dry, powdery components are intimately mixed in a rotating drum or the like and water is added to the powder mixture obtained. To obtain a readily workable, dough-like paste, approximately 25 to 50 parts vol. water, preferably 30 to 40 parts vol. water, are added to 100 parts vol. powder mixture. The paste is desirably prepared in a container equipped with a mechanical agitator. The paste is ready for use after an agitation period of approximately 5 minutes and a following ripening period lasting a few minutes.

In addition to the named, necessary components according to the invention needed for the paste, further additions can be provided insofar as these are desired, such as dyes or pigments, fungicidal, bactericidal or herbicidal agents, and other desired additives.

The hardness and strength of the top layer provided according to the invention, as well as the sliding characteristics at the surface of this top layer, can be adjusted over a wide range by the appropriate selection of the components. Without a minimum proportion of quartz sand it is not possible to realize optimum sliding characteristics, particularly when it is wet. With the prescribed proportions of brick dust and quartz dust, an increase in the proportion of tile cement leads to an increase in the hardness and of the coefficients of static and sliding friction. Such coefficients of friction can be evaluated as an indication of the sliding characteristics. To determine these coefficients of friction a test piece of smooth shoe-sole rubber (10 cm long, 5 cm wide, and 0.5 cm thick) exposed to a load of 15 kp is moved with a speed of initially 0 and finally 3 cm/sec across the test surface. The necessary traction is determined with a dynamometer, and the coefficient of friction is established according to the following formula: coefficient of friction = traction/load. The coefficient of static friction relates to the force required to overcome inertia; the coefficient of sliding friction relates to the force necessary for a speed of 3 cm/sec. Under these conditions, coefficients of friction, static, and sliding were determined in the range 2.7 to 3.0 for known brick-dust surfaces. With the prescribed proportions of brick dust and tile cement, an increase in the proportion of quartz sand leads to a lowering of these friction coefficients, which promotes sliding on the surface of the top layer.

To prepare a paste suitable for the purposes of the invention, 100 parts by vol. brick dust can be mixed with 20 to 250 parts by vol. tile cement in powder form and 10 to 400 parts by vol. quartz sand. (Working with parts by volume has proved itself well in practice because in this way the effect of the widely-fluctuating moisture content, which is difficult to establish, is eliminated to a large extent.) Preferably, for the preparation of a paste 50 to 150 parts by vol. tile cement and 150 to 350 parts vol. quartz sand are added to 100 parts vol. brick dust. Particularly preferred is a ratio of 70 to 120 parts by vol. tile cement and 250 to 350 parts by vol. quartz sand to 100 parts vol. by brick dust.

A number of recipes are listed below for the preparation of usable pastes.

| Brickdust parts vol. | Tile cement parts vol. | Quartz sand parts vol. | Water parts vol. | Comment conc. result. top layer |
|---|---|---|---|---|
| 3 | 1 | 1 | 1.5 | good |
| 4 | 1 | 1 | 1.7 | usable |
| 5 | 1 | 1 | 2 | usable |
| 2 | 1 | 2 | 1.5 | good |
| 1 | 1 | 3 | 1.5 | very good |
| 1 | 2 | 2 | 2 | hard |
| 1 | 3 | 1 | 2 | very hard |
| 2 | 0.5 | 2.5 | 1.5 | very elastic |

Depending upon the case, the compound Tile Cement I or Tile Cement II was used without leading to any noteworthy differences in the properties of the top layer.

Because of the great strength of the reaction product obtained from the paste of brick dust, tile cement, and quartz sand in water after reaction by setting and substantial removal of water, it can be applied in a relatively thin layer to the prepared base. The minimum layer thickness is determined by the length of life envisaged for the surface; in this regard the minimum layer thickness should be 10 mm, or at least, however, 5 mm. A maximum layer thickness derives from the observation that the softness of the top layer increases with increasing layer thickness thereof. For this reason, therefore, the layer thickness should not exceed 30 mm; in any event it should not be more than 35 mm. With greater layer thicknesses the formation of cracks must be reckoned with. Layer thicknesses of between 15 and 25 mm give especially good results; a layer thickness of approximately 20 mm is preferred.

In many cases a satisfactory surface layer is obtained if the named paste is applied in the given thickness on a level, firm, dry, and water-pervious foundation. A foundation such as this could be provided by the natural, available ground (FIG. 1), or a prepared foundation could be involved (FIGS. 2, 3, and 4). As a foundation, the typical layer sequence for barn floors with filter, load-bearing, and dynamic layers, according to DIN 18 035 page 5, is particularly suitable and the top layer as provided according to the invention serves as surface (FIG. 2). With reference to the contents of DIN 18 035, page 5, these shall also be regarded as a part of the present specification insofar as they are necessary for the explanation of foundation, filter layer, load-bearing layer, and dynamic layer including their materials and requirements. Furthermore, the surface provided according to the invention can be applied to a bituminous-bound or cement-bound base, pervious to water, for example, on a base in the form of a known hard court (FIG. 3). If an existing asphalt or concrete layer whose permeability is inadequate is to serve as a base, a number of holes (as shown in FIG. 3) can be drilled through this layer, down to the subsoil, where water will be conveyed away. Quite special requirements are met by a substructure for whose preparation a primary layer of reinforced fine concrete is laid, over the entire area, on a subsoil which is essentially level and pervious to water; on this primary layer of reinforced fine concrete aerated or porous cement blocks are placed in rows, jointlessly, and finally the paste provided according to the invention is applied on the surface of these blocks (FIG. 4).

The layer of aerated or porous cement blocks serves as a step-dampening or cushioning layer and carries an approximately 2 cm thick top layer which is obtained from a doughlike paste of 1 part vol. tile cement, 1 part vol. brick dust, and 3 parts vol. quartz sand in 1.5 parts vol. water. This top layer sets within approximately 12 hours. In dry weather the court is ready for playing after approximately four to five days. If required, an adhesive layer of paste, prepared as prescribed, with tile cement in water, i.e., without the brick dust and quartz sand, can be provided between the top layer and the immediately adjoining underlayer.

According to another alternative, the top layer of the inventive surface for sports areas, particularly tennis courts, can be formed by preparing an intimate dry powder mixture of the components brick dust, other mineral material, preferably fine-grained quartz sand, and tile cement, spreading said dry powder mixture on a prepared, essentially level foundation as mentioned above, compacting said layer of powder mixture and applying the necessary amount of water in the form of a very fine water spray. For preparing the dry powder mixture, it is recommended first to add the mineral material (preferably quartz sand) into the mixing device, subsequently to add the powdery tile cement, and finally to add the brick dust.

The compacting of said layer of powder mixture can be done in a usual manner by means of a roller or the like as it is conventional in preparing and compacting the layers of known tennis courts having a top layer made essentially from brick dust.

The necessary amount of water is the amount which is easily absorbed by the layer of compacted powder mixture without noticeable water amounts remaining on the surface of the layer of compacted powder mixture. During the whole spraying action the forming of a continuous water layer on the surface of the layer of the compacted powder mixture should be avoided because such a great amount of water at a given moment would lead to an undesirable reaction of the powder mixture limited to the surface zone thereof.

The above-mentioned alternative method for preparing the inventive top layer of sports areas, particularly tennis courts, can be performed by using the conventional equipment and avoids the transportation of the highly viscous aqueous paste over large distances.

The surface according to the invention can be installed in the widest variety of sports centers. The surface of the present invention is particularly suitable for tennis courts. Additionally, this surface can be provided for indoor as well as outdoor courts because when used for tennis courts, there is neither an excessive generation of dust nor is there any need for watering as there is in the case of conventional brick-dust courts. Further application examples involve, among others, hard courts for other ball games, broad-jump tracks, and tracks for running and sprinting.

It is to be understood that the invention is not to be limited to the exact details of operation or exact compounds, compositions, methods, or procedures shown and described, as obvious modifications and equivalents will be apparent to one skilled in the art.

I claim:

1. A process for the manufacture of a surface for a sports area, such as a tennis court, characterized by applying a layer of a non-hydrated mixture consisting essentially of tile cement, brick dust and other powdered, non-hydrated and non-hydratable mineral material on a prepared, essentially level horizontal foundation and then hydrating the tile cement in situ in said layer; in that the non-hydrated mixture is formed in situ on said foundation by the steps comprising:

(a) preparing an intimate dry powder mixture of the components brick dust, other powdered, non-hydrated and non-hydratable mineral material, and dry tile cement;

(b) spreading said dry powder mixture on said foundation;

(c) compacting said layer of powder mixture; and (d) applying the necessary amount of water; and in that the tile cement before hydration consists of approximately 24.8 to 89.8 percent hydraulic cement, approximately 10 to 75 percent aggregate selected from sand or ground limestone, or both, and approximately 0.2 to 6.5 percent methyl cellulose together with one or more components selected from the class consisting of up to 10 percent interpolymer of vinyl chloride and vinyl propionate, up to 6 percent condensation product of melamin formaldehyde, up to 0.1 percent polyacrylamide, up to 25 percent trass, and up to 5 percent fibrous material.

2. A process according to claim 1, characterized in that the other mineral material is fine-grained quartz sand having a mean grain size 0.01 to 0.4 mm.

3. A process according to claim 2, characterized in that the mixture contains 20 to 250 parts vol. tile cement and 10 to 400 parts vol. quartz sand to 100 parts vol. brick dust.

4. A process according to claim 3, characterized in that the mixture contains 50 to 150 parts vol. tile cement and 150 to 350 parts vol. quartz sand to 100 parts vol. brick dust.

5. A process according to claim 4, characterized in that the mixture contains 70 to 120 parts vol. tile cement and 250 to 350 parts vol. quartz sand to 100 parts vol. brick dust.

6. A process according to claim 5, characterized in that the top layer has a thickness of approximately 5 to 35 mm.

7. A process according to claim 5, characterized in that the top layer has a thickness of approximately 15 to 25 mm.

8. A process for the manufacture of a surface for a sports area, such as a tennis court, characterized by applying a layer of a non-hydrated mixture consisting essentially of tile cement, brick dust and other powdered, non-hydrated and non-hydratable mineral material on a prepared, essentially level horizontal foundation and then hydrating the tile cement in situ in said layer; and in that the tile cement before hydration consists of approximately 24.8 to 89.8 percent hydraulic cement, approximately 10 to 75 percent aggregate selected from sand or ground limestone, or both, and approximately 0.2 to 6.5 percent methyl cellulose together with one or more components selected from the class consisting of up to 10 percent interpolymer of vinyl chloride and vinyl propionate, up to 6 percent condensation product of melamin formaldehyde, up to 0.1 percent polyacrylamide, up to 25 percent trass, and up to 5 percent fibrous material.

9. A process according to claim 8, characterized in that the non-hydrated mixture is formed in situ on said foundation by the steps comprising:
 (a) preparing an intimate dry powder mixture of the components brick dust, other powdered non-hydrated and non-hydratable mineral material, and dry tile cement;
 (b) spreading said dry powder mixture on said foundation;
 (c) compacting said layer of powder mixture; and
 (d) applying the necessary amount of water.

10. A process according to claim 9, characterized in that a foundation is provided with a layer sequence typical of a barn floor area having a dynamic layer, upon which dynamic layer the dry powder mixture is applied in order to form the barn floor surface according to the sequence of steps (a) to (d).

11. A process according to claim 9, characterized in that the powder mixture is applied to a base selected from a bituminous-bound or cement-bound base which is pervious to water.

12. A process according to claim 11, characterized in that in order to ensure permeability in said base, a number of holes are drilled, down as far as the subsoil.

13. A process according to claim 9, characterized in that on an essentially level subsoil, pervious to water, a primary layer of reinforced fine concrete is poured over the entire area, on which are laid aerated or porous cement blocks, lined up jointlessly, and on the surface of the layer of blocks is laid the powder mixture, in order to form the top layer according to the sequence of steps (a) to (d).

14. A process according to claim 9, characterized in that the necessary amount of water is applied in form of a very fine water spray in such a way that the formation of a continuous water layer on the surface of the layer of the compacted powder mixture is avoided.

15. A process according to claim 9, characterized in that the necessary amount of water is said amount which is easily absorbed by the layer of compacted powder mixture without there remaining noticeable water amounts on the surface of the layer of powder mixture.

16. A process according to claim 14, characterized in that the necessary amount of water is said amount which is easily absorbed by the layer of compacted powder mixture without there remaining noticeable water amounts on the surface of the layer of powder mixture.

* * * * *